United States Patent
Yan et al.

(10) Patent No.: US 11,521,356 B2
(45) Date of Patent: Dec. 6, 2022

(54) SYSTEMS AND METHODS FOR A SHARED INTERACTIVE ENVIRONMENT

(71) Applicant: Meta Platforms Technologies, LLC, Menlo Park, CA (US)

(72) Inventors: Chengyuan Yan, Fremont, CA (US); Ke Huo, Fremont, CA (US); Amrutha Hakkare Arunachala, Sunnyvale, CA (US); Chengyuan Lin, Redwood City, CA (US); Anush Mohan, Mountain View, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 102 days.

(21) Appl. No.: 16/598,104

(22) Filed: Oct. 10, 2019

(65) Prior Publication Data
US 2021/0110609 A1    Apr. 15, 2021

(51) Int. Cl.
| | | |
|---|---|---|
| *G06T 19/00* | (2011.01) | |
| *A63F 13/60* | (2014.01) | |
| *G02B 27/01* | (2006.01) | |
| *G06F 3/01* | (2006.01) | |
| *G06V 20/20* | (2022.01) | |

(52) U.S. Cl.
CPC ............ *G06T 19/006* (2013.01); *A63F 13/60* (2014.09); *G02B 27/017* (2013.01); *G06F 3/011* (2013.01); *G06F 3/016* (2013.01); *G06V 20/20* (2022.01)

(58) Field of Classification Search
None
See application file for complete search history.

(56) References Cited

U.S. PATENT DOCUMENTS

| | | | |
|---|---|---|---|
| 2005/0198389 A1* | 9/2005 | LaSalle | H04L 67/2823 709/246 |
| 2014/0298229 A1* | 10/2014 | Priest | G06Q 10/04 715/771 |
| 2018/0136815 A1 | 5/2018 | Tomizuka et al. | |
| 2018/0357780 A1 | 12/2018 | Young et al. | |
| 2019/0310761 A1* | 10/2019 | Agarawala | G06F 3/0485 |

(Continued)

FOREIGN PATENT DOCUMENTS

WO    WO-2019143572 A1 *    7/2019

OTHER PUBLICATIONS

International Search Report and Written Opinion on related PCT Appn. PCT/US2020/049613.

*Primary Examiner* — Sarah Le
(74) *Attorney, Agent, or Firm* — Foley & Lardner LLP (57) ABSTRACT

Systems and methods for maintaining a shared interactive environment include receiving, by a server, requests to register a first input device of a first user and a second input device of a second user with a shared interactive environment. The first input device may be for a first modality involving user input for an augmented reality (AR) environment, and the second input device may be for a second modality involving user input for a personal computer (PC) based virtual environment or a virtual reality (VR) environment. The server may register the first and second input device with the shared interactive environment. The server may receive inputs from a first adapter for the first modality and from a second adapter for the second modality. The inputs may be for the first and second user to use the shared interactive environment.

10 Claims, 4 Drawing Sheets

(56) References Cited

U.S. PATENT DOCUMENTS

2019/0313059 A1* 10/2019 Agarawala .............. G06F 3/011
2020/0128106 A1*  4/2020 McCormack .......... G06N 20/20
2020/0335001 A1* 10/2020 Freiwirth ................ G09B 5/06

* cited by examiner

SYSTEMS AND METHODS FOR A SHARED INTERACTIVE ENVIRONMENT

FIELD OF DISCLOSURE

The present disclosure is generally related to interactive environments, including but not limited to maintaining a shared interactive environment for a plurality of devices.

BACKGROUND

Artificial reality, such as a virtual reality (VR), an augmented reality (AR), or a mixed reality (MR), provides immersive experience to a user. In one example, a user wearing a head mounted display (HMD) can rotate his head, and an image of a virtual object corresponding to a location of the HMD and a gaze direction of the user can be displayed on the HMD to allow the user to feel as if the user is moving within a space of an artificial reality (e.g., a VR space, an AR space, or a MR space).

Artificial reality content, as part of games for instance, may be made available to users via their respective user devices. However, some artificial reality content may not be compatible with different devices. Such content may not be available across a plurality of different devices.

BACKGROUND

In one aspect, this disclosure is directed to a method. The method may include receiving, by a server, a first request to register a first input device of a first user, and a second request to register a second input device of a second user, with a shared interactive environment. The first input device may be for a first modality involving user input for an augmented reality (AR) environment, and the second input device is for a second modality involving user input for a personal computer (PC) based virtual environment or a virtual reality (VR) environment. The method may include registering, by the server, the first input device and the second input device with the shared interactive environment. The method may include receiving, by the server, from a first adapter for the first modality, first inputs for the first user to use the shared interactive environment, and from a second adapter for the second modality, second inputs for the second user to use the shared interactive environment.

In some embodiments, the second input device includes at least one of a mobile device, a tablet device, a gaming system, a laptop computer, or a desktop computer, for the PC based virtual environment. In some embodiments, the first input device is configured to map the shared interactive environment to a physical environment of the first user, by scanning a marker in the physical environment, and aligning a marker of the shared interactive environment with the marker in the physical environment. In some embodiments, the first inputs are first standardized inputs generated by the first adapter using inputs received by the first input device from the first user, and the second inputs are second standardized inputs generated by the second adapter using inputs received by the second input device from the second user. In some embodiments, the method further includes receiving, by the server from the first adapter, the first standardized inputs. The method may further include updating, by the server, the shared interactive environment according to the first standardized inputs. The method may further include transmitting, by the server, data corresponding to the updated shared interactive environment for rendering to the first user and the second user.

In some embodiments, the method further includes receiving, by the server, a third request to register a third input device of a third user with the shared interactive environment. The third input device may be for a third modality involving user input for a VR environment, and the second modality involves user input for a PC based virtual environment. The method may include registering, by the server, the third input device with the shared interactive environment. In some embodiments, the second modality involves user input for a VR environment. The method may further include receiving, by the server, spatial registration data of the first user from the first adapter, and spatial registration data of the second user from the second adapter. The method may further include updating, by the server, a representation of the shared interactive environment using the spatial registration data of the first user and the spatial registration data of the second user. The method may further include transmitting, by the server, the updated representation of the shared interactive environment to render to the first user and the second user.

In some embodiments, the method further includes receiving, by the server from the first adapter for the first modality, third inputs for the first user. The method may further include updating, by the server, the updated representation of the shared interactive environment using the third inputs. In some embodiments, the first user and the second user are physically co-located, and a representation of the first user and a representation of the second user are correspondingly rendered and co-located within the shared interactive environment. In some embodiments, the first adapter is intermediary to the server and the first input device, and the second adapter is intermediary to the server and the second input device.

In another aspect, this disclosure is directed to a system. The system includes a server in communication with first and second adapters. The server may be configured to receive a first request to register a first input device of a first user, and a second request to register a second input device of a second user, with a shared interactive environment. The first input device may be for a first modality involving user input for an augmented reality (AR) environment, and the second input device may be for a second modality involving user input for a personal computer (PC) based virtual environment or a virtual reality (VR) environment. The server may be configured to register the first input device and the second input device with the shared interactive environment. The server may be configured to receive, from the first adapter for the first modality, first inputs for the first user to use the shared environment, and from the second adapter for the second modality, second inputs for the second user to use the shared environment.

In some embodiments, the second input device comprises at least one of a mobile device, a tablet device, a gaming system, a laptop computer, or a desktop computer, for the PC based virtual environment. In some embodiments, the first input device is configured to map the shared interactive environment to a physical environment of the first user, by scanning a marker in the physical environment, and aligning a marker of the shared interactive environment with the marker in the physical environment. In some embodiments, the first inputs are first standardized inputs generated by the first adapter using inputs received by the first input device from the first user, and the second inputs are second standardized inputs generated by the second adapter using inputs received by the second input device from the second user.

In some embodiments, the server is configured to receive, from the first adapter, the first standardized inputs. The server may be configured to update the shared interactive environment based on the first standardized inputs. The server may be configured to transmit data corresponding to the updated shared interactive environment for rendering to the first user and the second user. In some embodiments, the server is configured to receive a third request to register a third input device of a third user with the shared interactive environment. The third input device may be for a third modality involving user input for a VR environment, and the second modality involves user input for a PC based virtual environment. The server may be configured to register the third input device with the shared interactive environment.

In some embodiments, the second modality involves user input for a VR environment. The server may be configured to receive spatial registration data of the first user from the first adapter, and spatial registration data of the second user from the second adapter. The server may be configured to update a representation of the shared interactive environment using the spatial registration data of the first user and the spatial registration data of the second user. The server may be configured to transmit the updated representation of the shared interactive environment for rendering to the first user and the second user. In some embodiments, the server is configured to receive, from the first adapter configured for the first modality, third inputs for the first user. The server may be configured to update the updated representation of the shared interactive environment using the third inputs. In some embodiments, the first user and the second user are physically co-located, and a representation of the first user and a representation of the second user are correspondingly rendered and co-located within the shared interactive environment. In some embodiments, the first adapter is intermediary to the server and the first input device, and the second adapter is intermediary to the server and the second input device.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing.

DETAILED DESCRIPTION

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

Disclosed herein are systems and methods for maintaining a shared interactive environment. In one aspect, a server receives requests to register input devices of users with a shared interactive environment. Some input devices may be for a modality involving user inputs for an augmented reality (AR) environment, a modality involving user input for a personal computer (PC) based virtual environment, a modality involving user input for a virtual reality (VR) environment, and so forth. The server may register the input devices with the shared interactive environment. The server may receive inputs from adapters for the respective modalities for using the shared interactive environment. By receiving the inputs from the adapters corresponding to the modalities, the shared interactive environment may be compatible with a plurality of different modalities. As such, the shared interactive environment may have broader cross-platform participation from a wide range of users. Also, by supporting a shared interactive environment, a user of a user device for a modality involving a PC-based virtual environment can interact with a user of a user device for a modality involving an AR environment or a VR environment.

Figure 1:
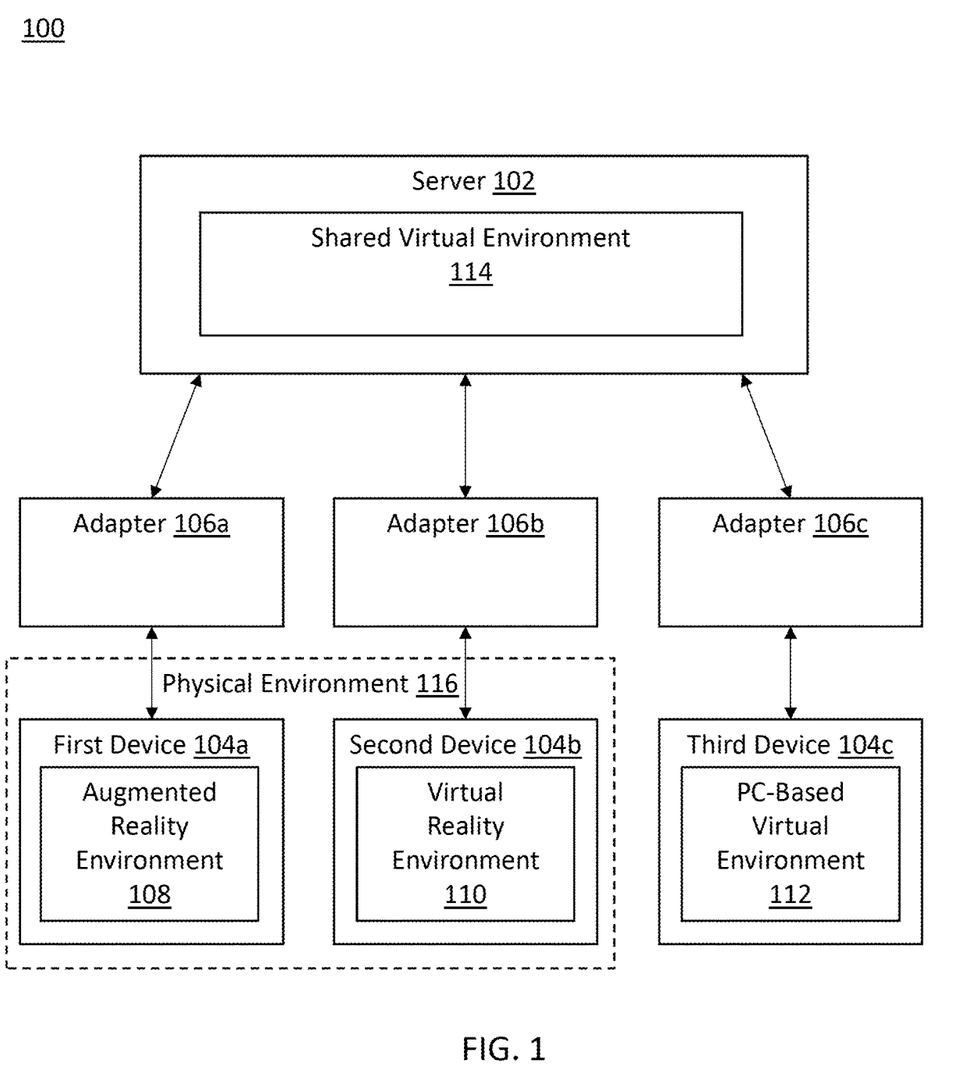
FIG. 1 is a diagram of a system for maintaining a shared interactive environment, according to an example implementation of the present disclosure.

FIG. 1 is a block diagram of a system 100 for maintaining a shared interactive environment, according to an illustrative embodiment. The system 100 is shown to include a server 102, a plurality of input devices 104, and/or a plurality of adapters 106 arranged intermediary to the server 102 and the input devices 104. The input devices 104 may be configured for respective modalities involving user inputs for corresponding environments (e.g., a first input device 104a configured for a modality involving user inputs for an augmented reality (AR) environment 108, a second input device 104b configured for a modality involving user inputs for a virtual reality (VR) environment 110, a third input device 104c configured for a modality involving user inputs for a personal computer (PC)-based virtual environment 112, etc.). As described in greater detail below, the server 102 may be configured to receive a request to register a first input device 104 of a first user and a second input device 104 of a second user with a shared interactive environment 114. The server 102 may be configured to register the first and second input devices 104 with the shared interactive environment. The server 102 may receive inputs from the adapters 104 for the users to use the shared interactive environment.

Figure 4:
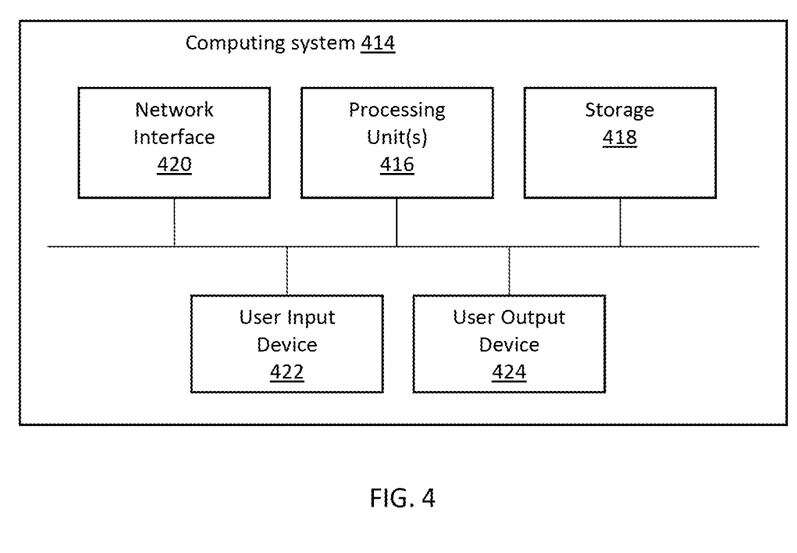
FIG. 4 is a block diagram of a computing environment according to an example implementation of the present disclosure.

Various components and elements of the system 100 may be implemented on or using components or elements of the computing environment shown in FIG. 4 and subsequently described. Furthermore, various components of the system 100 may be modified or embodied on different components. For instance, the adapters 106 may can include plug-ins, extensions, or other form or combination of software and/or hardware embodied on the corresponding input devices 104 or embodied on the server 108. Accordingly, the present disclosure is not limited to the particular arrangements shown in FIG. 1.

The system 100 is shown to include a plurality of input devices 104. The system 100 may include a first input device 104a, a second input device 104b, and a third input device 104c. The system 100 may include further input devices 104, fewer input devices 104, etc. The input devices 104 may include mobile devices, tablet devices, gaming systems, laptop or desktop computers, wearable devices, etc. Each input device 104 may be configured for a particular modality. Modality, as used herein, can refer to a mode or manner in which a user experiences, interacts with, navigates, and/or controls an environment (e.g., of the corresponding input device 104). A input device 104 may be configured for a respective modality. For instance, the first input device 104a may be configured for a modality corresponding to an AR environment 108, the second input device 104b may be configured for a modality corresponding to a VR environment 110, the third input device 104c may be configured for a modality corresponding to a PC-based virtual environment, and so forth. A user of the first input device 104a may provide inputs (e.g., via the first input device 104a) for interacting in (e.g., experiencing, navigating, manipulating, using and/or controlling) the AR environment 108, a user of the second input device 104b may provide inputs (e.g., via the second input device 104b) for interacting in the VR environment 110, and a user of the third input device 104c may provide inputs (e.g., via the third input device 104c) for interacting in the PC-based virtual environment 112. Such inputs may each be unique to the input device 104 and corresponding environment, as described in greater detail below.

The first input device 104a may be configured with a modality for interacting with an AR environment 108. In some embodiments, the first input device 104a may be similar in some respects to the device shown in FIG. 4 and subsequently described. The user may provide inputs for interacting with or controlling a virtual character (e.g., an avatar) in the AR environment. The first input device 104a may be a wearable device (e.g., including a head-mounted display). The first input device 104a may include an input device communicably coupled thereto. Together, the user may operate the input device and first input device 104a to provide inputs for controlling a virtual character's actions within the AR environment 108. The user may control the virtual character's actions through various human-computer interface components and capabilities (e.g., on the first input device 104a and/or another input device 104b, 104c). In some implementations, the input device may be a joystick (physical or virtual), controller, keyboard, mouse, touchpad or other device including a plurality of buttons. The user may provide inputs to the input device for controlling the actions of the virtual character.

In some embodiments, the first input device 104a may support alternative forms of inputs for controlling actions of the virtual character. For instance, the first input device 104a may support two-dimensional (2D) gestures (e.g., swiping, tapping, drawing, etc., on a 2D surface, such as a touch-screen). As another example, the first input device 104a may support three-dimensional (3D) gestures. The first input device 104a may include various sensors (e.g., an inertial measuring unit (IMU), global positioning system (GPS), etc.) designed or implemented to track motion, movement, trajectory, path, etc., of the first input device 104a. The user may provide inputs to the first input device 104a by performing various 3D gestures (moving the first input device 104a in a particular manner, for instance).

The user may provide inputs for controlling movement of the virtual player in the virtual environment (e.g., shared interactive environment). In some implementations, the user may provide inputs (e.g., via a joystick, controller, keyboard, mouse, etc.) for controlling motion of the virtual player. As such, the first input device 104a may support non-ego tracking (e.g., where movement of the virtual character is independent of the user's physical movement in the physical environment 116). The first input device 104a can support ego-tracking. The first input device 104a may include various sensors (e.g., within a head unit which houses the display, within the input device, etc.) which track motion and mobility of the first input device 104a (and, correspondingly, the first user). The first input device 104a may be communicably coupled to one or more external sensors arranged in a physical environment 116 of the first input device 104a. The external sensors may be configured to track motion of the user of the first input device 104a in the physical environment 116. In combination, the first input device 104a may be configured to track the user's physical motion in the physical environment 116. The first input device 104a may use the tracked physical motion of the user as an input for interacting in the AR environment 108. In some implementations, the ego-tracking may be localized (e.g., tracking the user's motion within a small range for updating the virtual character's position within a small range). In some implementations, the ego-tracking may be long distance (e.g., teleporting the virtual character's position to a different location at which the user can control the virtual character's position).

The second input device 104b and third input device 104c may similarly be configured to receive user inputs for controlling virtual characters in their respective environments. Through implementing different modalities, the second and third input device 104b, 104c may support different types of inputs. The second input device 104b (e.g., which supports a VR environment 110) may support traditional inputs and 3D gestures for controlling the virtual characters actions, may support ego-tracking for controlling the virtual characters movements, etc. In some embodiments, the second input device 104b may have a number of degrees of freedom in which the second input device 104b receives inputs. For instance, the second input device 104b may be or include a PC VR device (e.g., a PC-based VR system), a mobile three degrees of freedom (DoF) VR device, a mobile six DoF VR device, etc. Each of these devices may have different capabilities for receiving inputs for controlling the virtual characters actions and/or mobility. As one example, the mobile three DoF VR device may have limited capabilities of receiving 3D gestures, whereas the mobile six DoF VR device and the PC VR device may have full capabilities for receiving 3D gestures. The third input device 104c (e.g., which supports a PC-based virtual environment 112) may support only traditional (or, optionally, 2D gestures) inputs for controlling the virtual characters actions and motion. In other words, each modality for a corresponding environment may support different inputs for interacting in the environment. Further, the inputs may have varying degrees of immersion. As described in greater detail below, the server 102 may be configured to host, maintain, or otherwise provide a shared virtual environment or mixed reality environment (sometimes referred as a shared interactive environment) in which each of the input devices 104 are capable of interacting, despite having different degrees of immersion and different inputs for controlling virtual characters.

The server 102 may be configured to receive requests from input devices 104 for registering the input devices 104 with a shared interactive environment 114. The shared interactive environment 114 may include a virtual and/or mixed-reality environment in which devices supporting different types of environments and modalities (e.g., associated with VR, AR, PC) are configured to interact. Each request may include various information corresponding to the respective input device 104 and corresponding user. For instance, the requests may include identification information corresponding to the user (e.g., a user ID or username and password, a user tag or nickname). The requests may further include information corresponding to the input device 104 (e.g., a device identifier, such as an internet protocol (IP) address, an identification of a device type, an identification of a modality supported by the input device 104, etc.). The server 102 may be configured to receive the requests from the input device 104. In some implementations, the server 102 may be configured to receive the requests from the input device 104 through or via a corresponding adapter 106. The server 102 may be configured to identify the modality supported by the input device 104 based on from which adapter 106 the server 102 received the request.

The server 102 may be configured to analyze, parse, or otherwise evaluate the requests for registering the corresponding input devices 104. The server 102 may parse the requests to identify the user corresponding to the requests. The server 102 may identify a virtual character for representing the user in the shared interactive environment 114 based on the identifying information corresponding to the user. The user may set up (e.g., on their respective input device 104 or on a different device) their virtual character, which may be saved and accessible by the server 102. The server 102 may retrieve the virtual character corresponding to the user based on the identity of the user. The server 102 may register the input device 104 and the virtual character with the shared virtual environment 114. Each input device 104 may be configured to provide, transmit, or otherwise initiate requests for registering with the shared interactive environment 114. The server 102 may be configured to process the requests from each respective input device 104 to register such devices with the shared interactive environment 114.

In some embodiments, two or more input devices 104 may be located in a common geographical location (e.g., two devices may be physically co-located). As shown in FIG. 1, the first and second input device 104*a*, 104*b* may be physically co-located in the same physical environment 116. However, the third input device 104*c* may be located at a different location than the first and second input device 104*a*, 104*b*. As described in greater detail below, the first and second input device 104*a*, 104*b* may be configured to map the shared interactive environment 114 to the physical environment 116. In other words, the first and second input device 104*a*, 104*b* may be physically located in substantially the same environment, and the shared interactive environment 114 may be mapped to the same environment. The virtual characters for the users of the first and second input device 104*a*, 104*b* may be rendered and co-located within the shared interactive environment 114 (e.g., since the input devices 104*a*, 104*b* are correspondingly co-located).

Following registration of input devices 104 with the shared interactive environment 114, the input devices 104 may be configured to provide inputs for controlling the virtual characters within the shared interactive environment 114. As described in greater detail below, each input device 104 may provide inputs to their corresponding adapter 106. The adapters 106 may be configured to convert, map, translate, modify or otherwise standardize the inputs from the respective input devices 104 into standardized inputs (e.g., according to common or shared formats, metrics, representations, etc., that are comparable across sources or input devices), which are in turn transmitted from the adapters 106 to the server 102. The server 102 may be configured to update the shared virtual environment 114 based on the inputs (e.g., from the adapters 106), and transmit data corresponding to the updated shared virtual environment 114 to the input devices 104.

Figure 2:
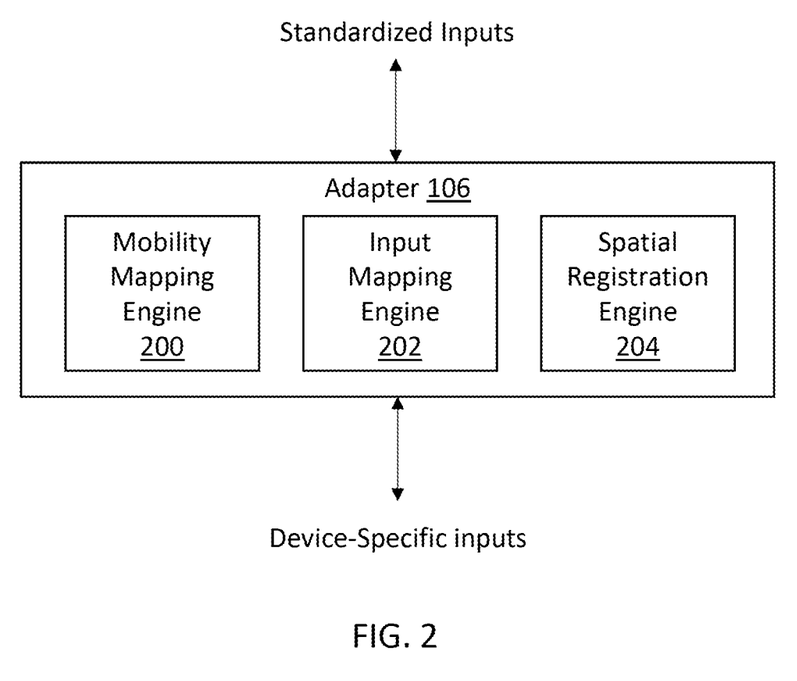
FIG. 2 is a diagram of an adapter for the system of FIG. 1, according to an example implementation of the present disclosure.

Referring now to FIG. 2, an example adapter 106 is shown, according to an illustrative embodiment. As shown in FIG. 1 and FIG. 2, each adapter 106 may be specific to a particular modality. In some implementations, each input device 104 may have a dedicated adapter 106 which supports the modality for the corresponding input device 104. In some implementations, input devices 104 which implement a common modality may share a common adapter 106. In other words, an adapter 106 may support a plurality of input devices 104 which implement a common modality. The adapter 106 may include a mobility mapping engine 200, an input mapping engine 202, and a spatial registration engine 204. In some instances, some of these engines 200-204 may be combined. Further, some engines 200-204 may be foregone or absent in a particular adapter 106. For instance, the third input device 104*c*, which does not support ego-tracking, may not include a spatial registration engine 204 (as the third input device 104*a* does not track the user's movement/mobility for updating the movement/actions virtual character in the shared interactive environment 114). Each of the engines 200-204 may generally be configured to convert, transform, or otherwise translate inputs received from the corresponding input devices 104 to standardized inputs for the server 102.

The adapter 106 is shown to include a mobility mapping engine 200. The mobility mapping engine 200 may include any device, component, element, process, library, script, or combination of hardware and software designed or implemented to control movement of a virtual character based on inputs from a user. The mobility mapping engine 200 may be designed or implemented to translate inputs for controlling the virtual character's motion (e.g., in the shared interactive environment 114). Various movement inputs may include, for instance, walking forward, backward, moving left and right, pivoting left and right, etc. The mobility mapping engine 200 may be configured to receive inputs from a input device 104. The inputs, as shown in FIG. 2, may be device-specific. The mobility mapping engine 200 may be designed or implemented to parse inputs received from the input device 104 for translating the device-specific inputs into standardized inputs.

In some implementations, the mobility mapping engine 202 may include, maintain, or otherwise access a database or other data structure. The data structure may be or include a table, mapping or ledger which includes a plurality of device-specific inputs and corresponding standardized inputs. Each mobility mapping engine 200 may access a table, mapping or ledger which is associated with the modality for the input device 104. For instance, the mobility mapping engine 200 of the adapter 106*a* for the first input device 104*a* may access a table or ledger for a modality corresponding to an AR environment 108, the mobility mapping engine 200 of the adapter 106*b* for the second input device 104*b* may access a table or ledger for a modality corresponding to a VR environment 110, and the mobility mapping engine 200 of the adapter 106*c* for the third input device 104*c* may access a table or ledger for a modality corresponding to a PC-based virtual environment 112.

Each table, mapping or ledger may include device-specific inputs for controlling the mobility of a virtual character and corresponding standardized inputs for controlling the mobility of the virtual character. For instance, the table, mapping or ledger may include device-specific inputs corresponding to traditional motion control (e.g., non-ego tracking inputs, such as those typically provided via a keyboard, mouse, physical or virtual joystick, etc.). The table, mapping or leger may correspondingly include standardized inputs corresponding to the device-specific inputs for traditional motion control. Similarly, the table, mapping or ledger may include device-specific inputs corresponding to ego-tracking motion control (e.g., localized or long distance ego-tracking). The table or ledger may include standardized inputs corresponding to the device-specific inputs for ego-tracking motion control.

The mobility mapping engine 200 for a specific adapter 106 may access a modality-specific table, mapping or ledger. For instance, the mobility mapping engine 200 of the first adapter 106a may access a table or ledger which is specific to a modality of an AR environment. The table, mapping or ledger corresponding to the first adapter 106a may include device-specific inputs corresponding to traditional motion control and ego-tracking motion control. The mobility mapping engine 200 for the third adapter 106c may access a table, mapping or ledger which is specific to a modality of a PC-based virtual environment. The table, mapping or ledger corresponding to the third adapter 106c may include device-specific inputs corresponding to traditional motion control. In other words, the tables, mappings or ledgers corresponding to specific adapters 106 may be different (e.g., depending on the capabilities of the corresponding devices).

The mobility mapping engine 200 may be configured to access the modality-specific table, mapping or ledger for translating device-specific inputs into standardized inputs. Each modality-specific table for instance may include device-specific inputs and standardized inputs corresponding thereto. The mobility mapping engine 200 may be configured to perform a look-up function using a device-specific input in the modality-specific table for identifying a standardized input corresponding to the device-specific input. The mobility mapping engine 200 may be configured to perform look-ups for each of the device-specific inputs received from a respective input device 104. The mobility mapping engine 200 may be configured to generate, as an output, standardized inputs which correspond to received device-specific inputs. As such, the mobility mapping engine 200 may act as a "translator" for input devices 104 by translating device-specific inputs from the devices into standardized inputs for the server 102. The mobility mapping engine 200 may be configured to provide the standardized inputs to the server 102 for updating the shared virtual environment 114 (e.g., controlling a virtual character's movement in the shared virtual environment 114).

The adapter 106 is shown to include an input mapping engine 202. The input mapping engine 202 may include any device, component, element, process, library, script, or combination of hardware and software designed or implemented to control actions of the virtual character based on inputs from a user. The input mapping engine 202 may be designed or implemented to translate inputs for controlling the virtual character's actions (e.g., in the shared interactive environment 114). Some actions which a virtual character may perform include shooting, reflecting, blocking, ducking, laying down, sprinting, jumping, etc. Such actions may be independent from (or work together with) the mobility inputs. The input mapping engine 202 may be configured to receive inputs from a input device 104. Similar to the device-specific inputs for controlling the virtual character's motion, the inputs for controlling the virtual character's actions, as shown in FIG. 2, may be device-specific. The input mapping engine 202 may be designed or implemented to parse inputs received from the input device 104 for translating the device-specific inputs into standardized inputs.

In some implementations, the input mapping engine 202 may include, maintain, or otherwise access a database or other data structure. The data structure may be or include a table, mapping or ledger which includes a plurality of device-specific inputs and corresponding standardized inputs. Each input mapping engine 202 may access a table, mapping or ledger which is associated with the modality for the input device 104. For instance, the input mapping engine 202 of the adapter 106a for the first input device 104a may access a table or ledger for a modality corresponding to an AR environment 108, the input mapping engine 202 of the adapter 106b for the second input device 104b may access a table or ledger for a modality corresponding to a VR environment 110, and the input mapping engine 202 of the adapter 106c for the third input device 104c may access a table or ledger for a modality corresponding to a PC-based virtual environment 112.

Each table, mapping or ledger may include device-specific inputs for controlling the actions of a virtual character and corresponding standardized inputs for controlling the actions of the virtual character. For instance, the table, mapping or ledger may include device-specific inputs corresponding to traditional action control (e.g., inputs provided via buttons or other interface elements, such as those typically provided via a keyboard, mouse, physical or virtual joystick, etc.). The table, mapping or leger may correspondingly include standardized inputs corresponding to the device-specific inputs for traditional action control. Similarly, the table, mapping or ledger may include device-specific inputs corresponding to 2D gestures (e.g., swipes or taps or double taps on a physical surface), 3D gestures (e.g., data from IMU, GPS, or other motion/trajectory tracking information). The table, mapping or ledger may include standardized inputs corresponding to the device-specific inputs for 2D or 3D gestures.

The input mapping engine 202 for a specific adapter 106 may access a modality-specific table, mapping or ledger. For instance, the input mapping engine 202 of the first adapter 106a may access a table or ledger which is specific to a modality of an AR environment. The table or ledger corresponding to the first adapter 106a may include device-specific inputs corresponding to traditional action control, 2D gestures and 3D gestures. The mobility mapping engine 200 for the second adapter 106b may access a table or ledger which is specific to a modality of a PC-based virtual environment. The table or ledger corresponding to the second adapter 106b may include device-specific inputs corresponding to traditional action control and 3D gestures (e.g., depending on the type of input device 104b and the degrees of freedom). The mobility mapping engine 200 for the third adapter 106c may access a table or ledger which is specific to a modality of a VR environment. The table or ledger corresponding to the third adapter 106c may include device-specific inputs corresponding to traditional action control. In other words, the tables, mappings or ledgers corresponding to specific adapters 106 may be different (e.g., depending on the capabilities of the corresponding devices).

Similar to the mobility mapping engine 200, the input mapping engine 202 may be configured to access the modality-specific table, mapping or ledger for translating device-specific inputs for controlling actions of the virtual character into standardized inputs for controlling actions of the virtual character. Each modality-specific table may include device-specific inputs and standardized inputs corresponding thereto. The input mapping engine 202 may be configured to perform a look-up function using a device-specific input in the modality-specific table for identifying a standardized input corresponding to the device-specific input. The input mapping engine 202 may be configured to perform look-ups for each of the device-specific inputs received from a respective input device 104. The input mapping engine 202 may be configured to generate, as an output, standardized inputs which correspond to received device-specific inputs. As such, the input mapping engine 202 may act as a "translator" for input devices 104 by translating device-specific inputs from the input devices 104 for controlling actions of the virtual character into standardized inputs for the server 102. The mobility mapping engine 200 may be configured to provide the standardized inputs to the server 102 for updating the shared virtual environment 114 (e.g., controlling virtual character's actions in the shared virtual environment 114).

The adapter 106 is shown to include a spatial registration engine 204. The spatial registration engine 204 may be any device, component, element, process, library, script, or combination of hardware and software designed or implemented to align, register, associate or map a physical environment 116 of devices with the shared virtual environment 114. The spatial registration engine 204 may be included, maintained, provided, or otherwise accessible by adapters 106 which correspond to input devices 104 having modalities which support a VR environment 110 or AR environment 108. In some embodiments, the spatial registration engine 204 may be accessibly by adapters 106 which correspond to devices having six DoF. The spatial registration engine 204 may be configured to support device-space alignment and scene alignment. The spatial registration engine 204 may support device-space alignment and scene alignment such that users of corresponding devices are provided a more immersive experience.

The spatial registration engine 204 may be configured to assist in alignment of a position of a virtual character (e.g., in the shared virtual environment 114) with a position of the user in the physical environment 116. Users may capture images (e.g., using their respective input device 104) of markers located in the physical environment 116. The markers may be positioned on various surfaces and objects within the physical environment 116. The input device 104 may be configured to transmit the images to the corresponding adapter 106. The adapter 106 may be configured to process the images to detect the markers. The spatial registration engine 204 may be configured to identify the markers in the physical environment 116. The spatial registration engine 204 may be configured to infer, detect, identify, or otherwise determine a pose (e.g., position, orientation, etc.) of the user based on a relative position of the user to the markers. The spatial registration 204 may be configured to modify, change, update, or otherwise adapt a pose of the virtual character based on the determined pose of the user in the physical environment.

The spatial registration engine 204 may be configured to assist in alignment of virtual objects in the shared virtual environment 114 with objects in the physical environment 116. The shared virtual environment 114 may include a pre-built scene with a predetermined number of virtual objects. The spatial registration engine 204 may be designed or implemented to update, modify, change, or otherwise move virtual objects within the shared virtual environment 114 based on detected object positions within the physical environment 116. As described above with reference to the pose of the virtual character, markers may be positioned on the objects in the physical environment 116. The input devices 104 may capture images of the physical environment 116 including the markers on the objects. The spatial registration engine 204 may be configured to receive the images from the input devices 104. The spatial registration engine 204 may be configured to parse the images to detect a position of the markers in the images. The spatial registration engine 204 may be configured to adapt a pose, position, size and/or orientation of the objects in the shared interactive environment 114 based on the detected pose, position, size and/or orientation of the markers in the images of the physical environment 116.

The shared interactive environment 114 may be shared amongst a plurality of users who are interacting via different modalities. For instance, a user of the first input device 104a, a user of the second input device 104b, and/or a user of the third input device 104c may together interact with each other in the same shared interactive environment. In some instances, the first and second input device 104a, 104b may be co-located in the same physical environment 116 (as shown in FIG. 1). As such, the virtual characters corresponding to the first and second input device 104a, 104b may be co-located in the shared virtual environment. The users may provide inputs (e.g., via their respective input devices 104) for interacting in the shared interactive environment 114. Such inputs may be transmitted from the input device 104 to the adapter 106 (e.g., for translating device-specific inputs into standardized inputs). The adapter 106 may be configured to transmit the standardized inputs to the server 102 for updating the shared interactive environment 114.

In some embodiments, the server 102 is configured to receive inputs from a plurality of adapters 106 corresponding to a plurality of input devices 104. For instance, the server 102 may be configured to receive first standardized inputs generated by the first adapter 106a using inputs received by the first input device 104a from a first user, second standardized inputs generated by the second adapter 106b using inputs received by the second input device 104b from a second user, third standardized inputs generated by the third adapter 106c using inputs received by the third input device 104c from a third user, and so forth. The server 102 may be configured to update the shared interactive environment 114 based on the inputs received by server 102 from the adapters 104. The server 102 may be configured to update the shared interactive environment 114 (e.g., a representation or perspective of the shared interactive environment 114, actions of the virtual characters in the shared interactive environment 114, reactions of other virtual characters in the shared interactive environment 114, changes to the virtual environment, etc.) based on the standardized inputs received by the server 102. The server 102 may be configured to transmit data corresponding to the updated shared interactive environment 114 for rendering to the users. The data may include an updated representation of the shared interactive environment 114, changes from a previous version of the shared interactive environment 114, etc.

The server 102 may be configured to receive the spatial registration data from the spatial registration engines 204 based on data captured by the input devices 104. The server 102 may be configured to parse the spatial registration data to identify an orientation, location, position, size, scale or other pose information corresponding to the users (or objects) within the physical environment. The server 102 may be configured to update the representation of the shared interactive environment 114 (e.g., update a perspective or field of view of the shared interactive environment 114 from the perspective of one of the users, update an orientation, position, location, size or pose of virtual objects in the shared interactive environment 114, etc.). The server 102 may be configured to transmit the updated representation of the shared interactive environment for rendering to the users.

In these and other embodiments, the server 102 may be configured to transmit, send, or otherwise provide data corresponding to the shared interactive environment 114 to the input devices 104 for rendering to the users. The server 102 may provide data to the input devices 104 directly, or through the adapters 106. In either implementation, the input devices 104 may be configured to receive data corresponding to the updated shared interactive environment 114 for rendering to the user. The data may be an updated representation of the shared interactive environment 114, modifications from a previous representation of the shared interactive environment 114 (e.g., deltas), and so forth. The input device 104 may render the shared interactive environment 114 to the user. The user may correspondingly provide further inputs (e.g., via the respective input device 104), which are routed to the server 102 through the adapters 106. The server 102 may use those further inputs for updating the shared interactive environment 114. Accordingly, the users may provide inputs for interacting with the shared interactive environments 114.

Figure 3:
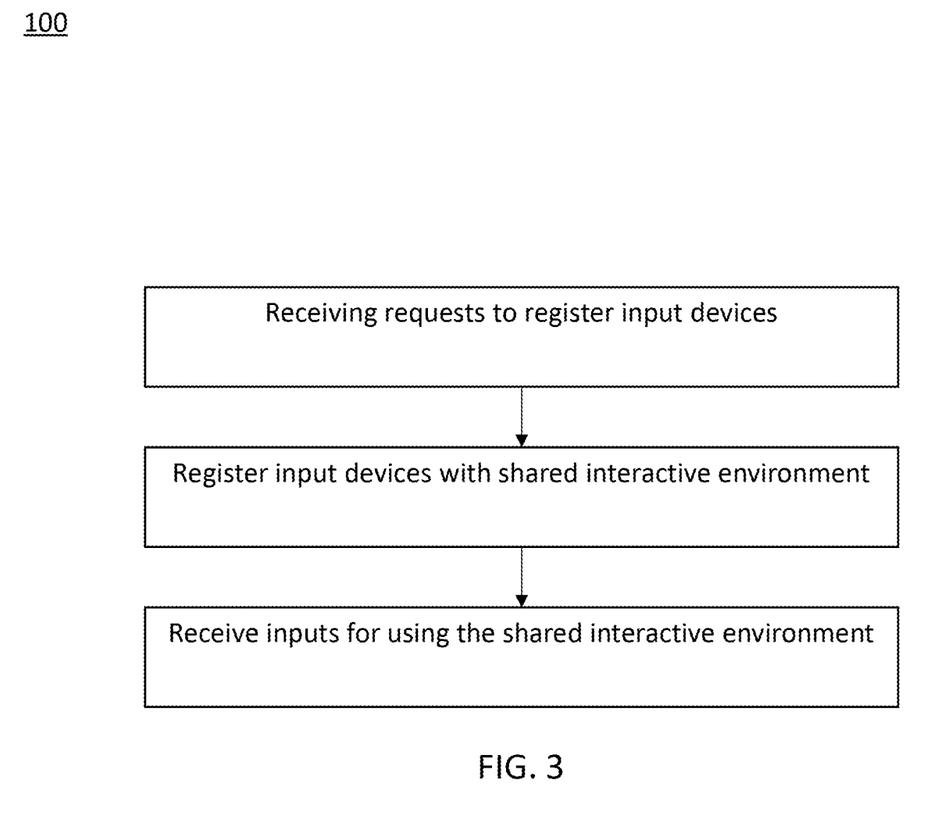
FIG. 3 is a flow chart illustrating a process of maintaining a shared interactive environment, according to an example implementation of the present disclosure.

Referring now to FIG. 3, depicted is a flowchart showing a process 300 of maintaining a shared interactive environment, according to an illustrative embodiment. The steps of the method 300 may be implemented by the components and elements described above with reference to FIG. 1-FIG. 2, such as the server 102, input devices 104, and/or adapters 106. In brief overview, at step 302, a server receives requests to register input devices. At step 304, the server registers the input devices with a shared interactive environment. At step 306, the server receives inputs for using the shared interactive environment.

At step 302, and in some embodiments, a server receives requests to register input devices. In some embodiments, the server receives a first request to register a first input device of a first user and a second request to register a second input device of a second user. The requests may be requests to register the input devices with a shared interactive environment. The shared interactive environment may be hosted on, maintained by, or otherwise associated with the server. The shared interactive environment may be an environment in which a plurality of different devices which support different modalities for environments may interact. For instance, the first input device may be configured for a first modality involving user input for an AR environment, and the second input device may be configured for a second modality involving user input for a PC-based virtual environment or a VR environment. The server may receive the request to register the input devices when a user selects an option or feature on the user device for launching the shared interactive environment. The request may include information corresponding to the user device, information corresponding to the user, etc. The server may receive the requests directly from the user input devices. In some instances, the server may receive the requests from an adapter arranged intermediary to the input devices and the server.

In some embodiments, the first input device may include a head mounted display. The head mounted display may face the user's eyes when the head mounted display is worn on the user's head. The first input device may provide a modality involving user input for an AR environment. Hence, the first input device may support AR inputs by a user for interacting in an AR environment. The second device may provide a modality involving user input for a VR or PC-based virtual environment. In some embodiments, the second input device may include a mobile device, a tablet device, a gaming system, a laptop computer, or a desktop computer, for the PC based virtual environment.

In some embodiments, the server may receive additional requests for registering further input devices with the shared interactive environment. For instance, the server may receive a third request to register a third input device of a third user with the shared interactive environment. In this embodiment, the third input device may be for a third modality involving user input for a VR environment, and the second modality may involve user input for a PC-based virtual environment (or vice versa). As such, the server may receive requests from devices which support a wide range of modalities involving inputs in a plurality of different environments (e.g., AR environments, VR environments, PC-based virtual environments, etc.).

At step 304, and in some embodiments, the server registers the input devices with a shared interactive environment. The server may register the first input device and the second input device with the shared interactive environment. The server may parse the requests (e.g., received at step 302) to identify the users corresponding to the respective input devices. The requests may include user identification information (e.g., username and password, pin, or other type or form of information which uniquely identifies a user). The server may use the user identification information for identifying, assigning or selecting a virtual character corresponding to the user. The server may parse the request to identify the user devices which transmitted the requests. The requests may include device identification information (e.g., an IP address for the device, a device type, a device name or nickname, or other type or form of information which uniquely identifies an input device). The server may use the device identification information for determining a modality corresponding to the request. As further requests (e.g., the third request, and further requests) are received by the server, the server may parse the requests for registering the input devices with the shared interactive environment.

In some embodiments, the input devices are configured to map the shared interactive environment to a physical environment. For instance, devices which support modalities corresponding to AR and VR environments may map the shared interactive environment to the physical environment of those corresponding devices. The first input device may map the shared interactive environment to a physical environment of the first user. The shared interactive environment may include markers located therein. Similarly, the physical environment may include markers located therein. The first input device may scan marker(s) located in the physical environment. The first input device may map the shared interactive environment to the physical environment of the first user by aligning the marker(s) of the shared interactive environment with marker(s) in the physical environment.

At step 306, and in some embodiments, the server receives inputs for using the shared interactive environment. In some embodiments, the server receive inputs for using the shared interactive environment from adapters for the respective modalities. For instance, the server may receive first inputs for the first user to use the shared interactive environment from a first adapter for the first modality, second inputs for the second user to use the shared interactive environment from a second adapter for the second modality, etc. As stated above, the adapters may be intermediary to the server and the input devices. The server may receive standardized inputs from the adapters. The adapters may generate the standardized inputs from inputs received by the input devices from the users. For instance, the first inputs (e.g., received by the server) may be first standardized inputs generated by the first adapter using inputs received by the first input device from the first user. The first adapter may perform a look-up function using inputs received from the first input device in a table or ledger to identify corresponding standardized inputs. The first adapter may transmit the standardized inputs to the server. Similarly, the second inputs (e.g., received by the server) may be second standardized inputs generated by the second adapter using inputs received by the second input device from the second user. The second adapter may perform a look-up function using inputs received from the second input device in a table or ledger to identify corresponding standardized inputs. The second adapter may transmit the standardized inputs to the server.

The server may update the shared interactive environment according to the received standardized inputs. The server may receive the standardized inputs from the adapters based on corresponding inputs provided by the user to their respective user devices. In some embodiments, the server may receive spatial registration data for users from corresponding adapters. The server may receive spatial registration data from users which provide inputs in a VR or AR environment. The server may update the shared interactive environment based on the spatial registration data from the users. The server may update a representation of the shared interactive environment, update a virtual character's pose in the shared interactive environment, update an object's pose in the shared interactive environment, etc., based on the standardized inputs received by the server. The servers may transmit data corresponding to the updated shared interactive environment to the devices for rendering to the users. In some embodiments, the servers may transmit an updated representation of the shared interactive environment, changes from a previous representation of the shared interactive environment, etc. The servers may transmit the data corresponding to the updated shared interactive environment directly to the input devices, route the data to the input devices through the corresponding adapters, etc. In these and other embodiments, the input devices may receive data corresponding to the updated shared interactive environment. The input devices may render the updated shared interactive environment to the users, and the users may provide further inputs/spatial recognition data for further interacting with the shared interactive environment.

Various operations described herein can be implemented on computer systems. FIG. 4 shows a block diagram of a representative computing system 414 usable to implement the present disclosure. In some embodiments, the server 102, client device 104, adapter 106, or each of FIG. 1 are implemented by the computing system 414. Computing system 414 can be implemented, for example, as a consumer device such as a smartphone, other mobile phone, tablet computer, wearable computing device (e.g., smart watch, eyeglasses, head mounted display), desktop computer, laptop computer, or implemented with distributed computing devices. The computing system 414 can be implemented to provide VR, AR, MR experience. In some embodiments, the computing system 414 can include conventional computer components such as processors 416, storage device 418, network interface 420, user input device 422, and user output device 424.

Network interface 420 can provide a connection to a wide area network (e.g., the Internet) to which WAN interface of a remote server system is also connected. Network interface 420 can include a wired interface (e.g., Ethernet) and/or a wireless interface implementing various RF data communication standards such as Wi-Fi, Bluetooth, or cellular data network standards (e.g., 3G, 4G, 5G, 60 GHz, LTE, etc.).

User input device 422 can include any device (or devices) via which a user can provide signals to computing system 414; computing system 414 can interpret the signals as indicative of particular user requests or information. User input device 422 can include any or all of a keyboard, touch pad, touch screen, mouse or other pointing device, scroll wheel, click wheel, dial, button, switch, keypad, microphone, sensors (e.g., a motion sensor, an eye tracking sensor, etc.), and so on.

User output device 424 can include any device via which computing system 414 can provide information to a user. For example, user output device 424 can include a display to display images generated by or delivered to computing system 414. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that function as both input and output device can be used. Output devices 424 can be provided in addition to or instead of a display. Examples include indicator lights, speakers, tactile "display" devices, printers, and so on.

Some implementations include electronic components, such as microprocessors, storage and memory that store computer program instructions in a computer readable storage medium. Many of the features described in this specification can be implemented as processes that are specified as a set of program instructions encoded on a computer readable storage medium. When these program instructions are executed by one or more processors, they cause the processors to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processor 416 can provide various functionality for computing system 414, including any of the functionality described herein as being performed by a server or client, or other functionality associated with message management services.

It will be appreciated that computing system 414 is illustrative and that variations and modifications are possible. Computer systems used in connection with the present disclosure can have other capabilities not specifically described here. Further, while computing system 414 is described with reference to particular blocks, it is to be understood that these blocks are defined for convenience of description and are not intended to imply a particular physical arrangement of component parts. For instance, different blocks can be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one imple- mentation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

The invention claimed is:

1. A method, comprising:
    receiving, by a server, a first request to register a first input device of a first user, and a second request to register a second input device of a second user, with a shared interactive environment which supports inputs via adapters from multiple input devices having multiple modalities, wherein the first input device is for a first modality involving user input for an augmented reality (AR) environment, and the second input device is for a second modality involving user input for a virtual reality (VR) environment;
    registering, by the server, the first input device and the second input device with the shared interactive environment;
    receiving, by the server, from a first adapter for the first modality intermediary to the server and the first input device, first standardized inputs for the first user generated by the first adapter, the first adapter generating the first standardized inputs using first user inputs to the first input device to use the shared interactive environment;
    receiving, by the server, from a second adapter for the second modality intermediary to the server and the second input device, second standardized inputs for the second user generated by the second adapter, the second adapter generating the second standardized inputs using second user inputs to the second input device to use the shared interactive environment;
    receiving, by the server, first spatial registration data of the first user from the first adapter, and second spatial registration data of the second user from the second adapter, the first spatial registration data identifying pose information of the first user with respect to a physical environment of the first user and the second spatial registration data identifying pose information of the second user with respect to a physical environment of the second user;
    updating, by the server, a representation of the shared interactive environment according to (1) the first spatial registration data, (2) the second spatial registration data, (3) the first standardized inputs and (4) the second standardized inputs; and
    transmitting, by the server, the updated representation of the shared interactive environment for rendering to the first user and the second user.

2. The method of claim 1, wherein the first input device is configured to map the shared interactive environment to a physical environment of the first user, by scanning a marker in the physical environment, and aligning a marker of the shared interactive environment with the marker in the physical environment.

3. The method of claim 1, further comprising:
    receiving, by the server, a third request to register a third input device of a third user with the shared interactive environment, wherein the third input device is for a third modality involving user input for a personal-computer (PC) based virtual environment; and
    registering, by the server, the third input device with the shared interactive environment.

4. The method of claim 1, further comprising:
    receiving, by the server from the first adapter for the first modality, third inputs for the first user; and
    updating, by the server, the updated representation of the shared interactive environment using the third inputs.

5. The method of claim 1, wherein the first user and the second user are physically co-located, and a representation of the first user and a representation of the second user are correspondingly rendered and co-located within the shared interactive environment.

6. A system comprising:
    a server in communication with first and second adapters, configured to:
    receive a first request to register a first input device of a first user, and a second request to register a second input device of a second user, with a shared interactive environment which supports inputs via adapters from multiple input devices having multiple modalities, the first input device for a first modality involving user input for an augmented reality (AR) environment, and the second input device for a second modality involving user input for a virtual reality (VR) environment;
    register the first input device and the second input device with the shared interactive environment;
    receive, from the first adapter for the first modality intermediary to the server and the first input device, first standardized inputs for the first user generated by the first adapter, the first adapter generating the first standardized inputs using first user inputs to the first input device to use the shared interactive environment;
    receiving, by the server from the second adapter for the second modality intermediary to the server and the second input device, second standardized inputs for the second user generated by the second adapter, the second adapter generating the second standardized inputs using second user inputs to the second input device to use the shared interactive environment;
    receive first spatial registration data of the first user from the first adapter, and second spatial registration data of the second user from the second adapter, the first spatial registration data identifying pose information of the first user with respect to a physical environment of the first user and the second spatial registration data identifying pose information of the second user with respect to a physical environment of the second user;

update a representation of the shared interactive environment according to (1) the first spatial registration data, (2) the second spatial registration data, (3) the first standardized inputs and (4) the second standardized inputs; and transmit the updated representation of the shared interactive environment for rendering to the first user and the second user.

7. The system of claim 6, wherein the first input device is configured to map the shared interactive environment to a physical environment of the first user, by scanning a marker in the physical environment, and aligning a marker of the shared interactive environment with the marker in the physical environment.

8. The system of claim 6, wherein the server is further configured to:

receive a third request to register a third input device of a third user with the shared interactive environment, wherein the third input device is for a third modality involving user input for a personal-computer (PC) based virtual environment; and register the third input device with the shared interactive environment.

9. The system of claim 6, wherein the server is further configured to:

receive, from the first adapter configured for the first modality, third inputs for the first user; and update the updated representation of the shared interactive environment using the third inputs.

10. The system of claim 6, wherein the first user and the second user are physically co-located, and a representation of the first user and a representation of the second user are correspondingly rendered and co-located within the shared interactive environment.

* * * * *